(12) United States Patent
Chen et al.

(10) Patent No.: US 9,194,425 B2
(45) Date of Patent: Nov. 24, 2015

(54) DEVICE OF THE AXIAL-DIRECTIONAL OIL CHAMBER OF HYDROSTATIC SPINDLE

(71) Applicant: INDUSTRIAL TECHNOLOGY RESEARCH INSTITUTE, Hsin-Chu (TW)

(72) Inventors: Shang-Te Chen, Taichung (TW); Hsin-Chuan Su, Yunlin County (TW); Yan-Sin Liao, Taichung (TW); Hsi-Hung Hsiao, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 14/159,851

(22) Filed: Jan. 21, 2014

(65) Prior Publication Data

US 2015/0117802 A1  Apr. 30, 2015

(30) Foreign Application Priority Data

Oct. 25, 2013 (TW) .............................. 102138708 A

(51) Int. Cl.
*F16C 32/06* (2006.01)

(52) U.S. Cl.
CPC ......... *F16C 32/0651* (2013.01); *F16C 32/0696* (2013.01)

(58) Field of Classification Search
CPC ............. F16C 32/0629; F16C 32/0633; F16C 32/064; F16C 32/0651
USPC .......................................... 384/107, 111, 118
See application file for complete search history.

(56) References Cited

U.S. PATENT DOCUMENTS

| 3,493,273 | A | | 2/1970 | Greenberg | |
|---|---|---|---|---|---|
| 3,934,947 | A | * | 1/1976 | Walter et al. | ................... 384/111 |
| 3,934,948 | A | * | 1/1976 | Pruvot | ........................... 384/111 |
| 5,073,037 | A | | 12/1991 | Fujikawa et al. | |
| 5,462,364 | A | | 10/1995 | Chandrasekaran et al. | |
| 5,833,522 | A | | 11/1998 | Niino et al. | |
| 5,921,731 | A | | 7/1999 | Chandrasekar | |

(Continued)

FOREIGN PATENT DOCUMENTS

| CN | 1621703 A | 6/2005 |
|---|---|---|
| CN | 2735067 Y | 10/2005 |

(Continued)

OTHER PUBLICATIONS

Kane, N.R. et al., A hydrostatic rotary bearing with angled surface self-compensation, Precision Engineering, 2003, pp. 125-139, vol. 27. Elsevier, Cambridge, MA, USA.

(Continued)

*Primary Examiner* — Phillip A Johnson
(74) *Attorney, Agent, or Firm* — Locke Lord LLP; Tim Tingkang Xia, Esq.

(57) ABSTRACT

A device of the axial-directional oil chamber of hydrostatic spindle comprises integrated oil seal structures at both the axial direction and the radial direction. The oil seal structures increase the work area of the oil chamber by extending and thus connecting an axial-directional oil seal edge to a radial-directional oil seal edge. Then, the rigidity of the axial hydrostatic bearing can be increased, and thus the application capability of the hydrostatic spindle can be upgraded to perform the multi-task machining from the mono-task machining.

12 Claims, 10 Drawing Sheets

(56) References Cited

U.S. PATENT DOCUMENTS

| | | | |
|---|---|---|---|
| 6,036,413 A | 3/2000 | Chandrasekar | |
| 6,364,190 B1 * | 4/2002 | Tor | 227/10 |
| 6,367,977 B1 | 4/2002 | Kashchenevsky | |
| 8,465,207 B2 | 6/2013 | Maier et al. | |

FOREIGN PATENT DOCUMENTS

| | | |
|---|---|---|
| CN | 201231447 Y | 5/2009 |
| CN | 102490065 A | 6/2012 |
| CN | 102501079 A | 6/2012 |
| CN | 102950301 A | 3/2013 |
| TW | I299014 B | 7/2008 |
| TW | I309593 B | 5/2009 |
| TW | M389790 U1 | 10/2010 |
| TW | 201043800 A | 12/2010 |
| TW | M408435 U | 8/2011 |
| TW | I401136 B | 7/2013 |

OTHER PUBLICATIONS

Brunner, Christoph, Design of Linear Hydrostatic Bearings, Submitted to the Department of Machanical Engineering in Partial Fulfillment of the Requirements for the Degree of Master of Science at the Massachusetts Institute of Technology, Dec. 1993, pp. 1-85, Massachusetts, USA.

Bassani, R. et al., Hydrostatic Bearings, Hydrostatic Lubrication, Tribology Series 22, Aug. 1, 1992, pp. 1-14, Elsevier Science.

Hydrostatic Systems in Machine Tools, Catalog for Transatlantic Connection, Inc., Aug. 2008, pp. 1-5.

Product Catalog for Hyprostatik, 2003, p. 1.

Slocum, Alexander H., Water Hydrostatic Bearings for Precision Machine Tools and Industrial Machinery, Department of Mechanical Engineering, Massachusetts Institute of Technology, 2003, Cambridge, MA, USA.

* cited by examiner

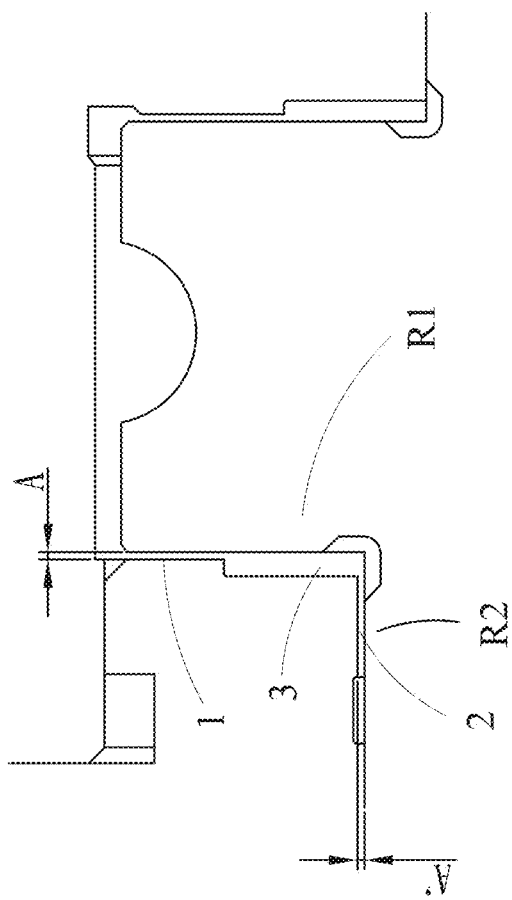

DEVICE OF THE AXIAL-DIRECTIONAL OIL CHAMBER OF HYDROSTATIC SPINDLE

CROSS REFERENCE TO RELATED APPLICATION

This application also claims priority to Taiwan Patent Application No. 102138708 filed in the Taiwan Patent Office on Oct. 25, 2013, the entire content of which is incorporated herein by reference.

TECHNICAL FIELD

The present disclosure relates to a device of the axial-directional oil chamber of hydrostatic spindle, and more particularly to the device applied to the hydrostatic-supporting bearing of the spindle system for multi-task machines, the spindle module, or a ball screw, in which the oil chamber device provided by the present disclosure can enhance the axial-directional rigidity and the rotational machining capacity of the spindle, and further by which the precision and the service life of the spindle can be increased.

BACKGROUND

In application of the rotational parts such as the spindle, the bearing is usually introduced to support and position the rotational part, by which the friction for working the rotational part can be reduced without sufficing the rated load. Conventionally, bearing for the rotational part such as a spindle is usually a ball bearing having an outer ring, an inner ring, balls or rollers, and a retainer ring, in which the balls or the rollers are running between the outer ring and the inner ring, and the fixed inter-ball spacing is kept by the retainer ring.

In the aforesaid design of the ball bearing, for the balls or rollers are used as the solid rolling media between the inner and the outer brings, all parts including the inner ring, the outer ring, the retainer and definitely the balls or rollers are all involved in the frictional motion and thus are all under frictional wearing while the spindle rotates. Hence, to hold on a satisfied operation of the spindle, a high manufacturing precision of the bearing is demanded. Yet, the service time for such a bearing is still limited, and can't meet the practical requirement. To search an answer for such a shortcoming of the conventional bearing, a fluid bearing is then provided to replace the balls or rollers with a thin layer of liquid or gas, in particular an oil membrane.

With the fluid-type oil membrane to replace the solid balls or rollers, the fluid bearing can reduce the rotational friction, provide higher precision, and control the noise and temperature. In the art, the fluid bearings are broadly classified into two types: fluid dynamic bearings and hydrostatic bearings. In this disclosure, the hydrostatic bearings are the concerned.

The hydrostatic bearings in the art are externally pressurized fluid bearings. The oil membrane is generated and served as a lubricant medium between contacting parts of the bearing. With the hydrostatic bearing applied to a spindle, the wear of the spindle can be reduced, the service life thereof can be prolonged, and only less power is needed to start the spindle. Also, the spindle supported by the hydrostatic bearing can be operated in a low cycling environment.

Importantly, it is the hydrostatic bearing that the multi-task machine integrating lathing, milling and grinding can then be possible. The reason why the hydrostatic bearing plays the critical role in the appearance of the multi-task machine is because the necking developments in managing the machining chips and bearing's pre-pressuring are resolved by introducing the hydrostatic bearings to load the spindles. In the art of conventional machining tools, the spindle is set to be light-preloaded, moderate-preloaded or heavy-preloaded according to different needs of machining. In addition, in order not to damage the high precision bearing prior to the predicted service life, the selection of the bearing would be determined in accordance with the machining loads of the equipments, which are classified into types of light cutting, moderate cutting and heavy cutting. The hydrostatic bearing is a non-contact bearing that won't shorten the predicted service life in the applicable load range, for either type of cutting, as long as the rigidity of the oil membrane is under control not to induce a membrane breakdown, or say a metal-to-metal contact, between parts of the hydrostatic bearing. It is noted that the hydrostatic bearing uses the lubricant oil for forming the membrane and the operational accuracy and the service life of the spindle are highly dependent on the rigidity of the membrane. Therefore, though the hydrostatic bearing is already superior to the conventional bearing in several manifolds, yet the issue of how to improve the axial-directional rigidity of the hydrostatic spindle is still a crucial topic in the art.

Following documents are provided to help understanding the current shortcomings in the art of the hydrostatic spindle.

As disclosed by the U.S. Pat. No. 5,462,364, the hydrostatic bearing has an elastic oil chamber for controlling the fluid flow. Even that the parameters for the chamber can be relevantly selected to provide a higher rigidity, the elasticity in the oil chamber still plays an uncertain role in promising a satisfied operational accuracy.

Further, in the U.S. Pat. No. 5,921,731, a hydrostatic spindle structure is disclosed to have a special symmetric oil chamber. Though the spindle can run at high speed, yet the rigidity for the oil membrane is yet to be improved. Due to the manufacturing difficulty in structuring the symmetric oil chamber, so an acceptable operational accuracy of the spindle and a higher rigidity of the membrane are still way to be achieved.

In the U.S. Pat. No. 6,367,977, a ball bearing is introduced to enhance the axial-directional rigidity for the spindle. Though the rigidity might be increased, yet the involvement of the ball bearing would be highly possible to reduce the operation accuracy and the service life.

In all of the aforesaid disclosures, it is obvious that the rigidity of the hydrostatic bearing is determined by the area of the oil chamber, the flow resistance caused by the oil seal and the operation of the flow regulator. Therefore, the present disclosure is provided to improve the bearing rigidity of the hydrostatic spindle.

SUMMARY

The hydrostatic bearing is a bearing that utilizes the hydraulic pressure to support the load, in which the lubricant oil is pressured by a hydraulic system and then sent via an orifice into the spacing between the shaft and the bearing. Hence, the issue of how to enlarge the oil chamber in the limited construction space is highly correlated to that of how to increase the rigidity of the hydrostatic bearing for the spindle. The device of the axial-directional oil chamber of hydrostatic spindle in this disclosure is to enlarge the axial-directional oil chamber sideward along the radial direction. Namely, within a limited space for the spindle apparatus, in accordance with the teaching of this disclosure, the area for the axial-directional oil chamber in enlarged, and the axial-directional rigidity of the hydrostatic bearing is increased, such that the application of the hydrostatic spindle can be much more various.

By providing the device of the axial-directional oil chamber of hydrostatic spindle, the rotational machining capability, the machining accuracy and the service life of the spindle can be enhanced.

Accordingly, this disclosure teaches a device of the axial-directional oil chamber of hydrostatic spindle which can be applied to the hydrostatic-supporting bearing of the spindle system for multi-task machines, the spindle module, or a ball screw. The device includes a hydrostatic oil chamber, an axial-directional oil seal edge of the oil chamber, and a radial-directional oil seal edge of the oil chamber. The spindle further has an axial-directional spacing and a radial-directional spacing. The axial-directional spacing and the radial-directional spacing pair with a sealed oil chamber surface according to the following manner. Each of the axial-directional spacing and the radial-directional spacing forms a flow resistance with the oil chamber surface. By further matching an oil-injection orifice of a restrictor, the spindle chamber can have thereinside the required rigidity. Namely, the flow resistance is formed between the axial-directional oil seal edge of the oil chamber and the axial-directional spacing, while another flow resistance is formed between the radial-directional oil seal edge of the oil chamber and the radial-directional spacing. Upon such an arrangement, the axial-directional flow resistance would change as the axial-directional spacing does. Also, the radial-directional flow resistance would change as the radial-directional spacing does. The total flow resistance is the sum of the axial-directional flow resistance and the radial-directional flow resistance. By having the total flow resistance inside the axial-directional oil chamber of the spindle and further having the orifice of the restrictor to restriction-control the pressure source, the rigidity of the hydrostatic axial-directional oil chamber in this disclosure can be substantially enhanced.

In this disclosure, optimal rigidity values for the hydrostatic axial-directional oil chamber of the present disclosure and the conventional hydrostatic axial-directional supporting-bearing oil chamber are obtained by having corresponding orifices of the restrictors to perform the flow restriction. Also, these rigidity values are obtained by assuming the same space occupation and the same design parameters. The optimal rigidity value for the conventional hydrostatic axial-directional supporting-bearing oil chamber under the control of the orifice of the restrictor is 9.46 kg/um, while that for the hydrostatic axial-directional oil chamber of the present disclosure is 13.6 kg/um. Obviously, the optimal value of the rigidity for the device taught by this disclosure is superior to that for the conventional design by 43%. Methods for obtaining the aforesaid rigidity value would be also disclosed in a later section of this disclosure.

Parameters and equations used in this disclosure for the hydrostatic oil chamber are shown as follows.

In this disclosure, ra stands for the outer diameter of the oil chamber, rb stands for the inner diameter of the oil chamber, a stands for the island width of the oil chamber, and b stands for the island length of the oil chamber. In addition, L stands for length of the oil chamber, and B stands for the width of the oil chamber.

Accordingly, the flow resistance R1 of the oil chamber is calculated by R1=12×viscosity coefficient×a×[L−b]/(spacing A)$^3$+24×viscosity coefficient×b×[B−a/2]/(spacing 1)$^3$+12×viscosity coefficient×a×[L−b]/(spacing A')$^3$. The flow resistance R2 of the orifice restrictor is calculated by R2=8×fluid density×Q(fluid flow)/(discharge coefficient$^2$×π$^2$×orifice diameter$^4$). The total flow resistance R is computed by R=R1+R2. Assuming that Ps is the pressure of the pressure source and Pa is the pressure of the oil chamber, thus Q=Ps/R, and Pa=Q×R1. Then, the rigidity=Pa (spacing A−0.001 mm)×(oil chamber working area)−Pa (spacing A)×(oil chamber working area). Namely, the rigidity is the thrust difference for a 0.001 mm increment at the oil membrane.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1-1 is an enlarged view of the oil chamber device of FIG. 1;

FIG. 6-1 is a schematic front view of the conventional axial-directional hydrostatic oil chamber in the art;

DETAILED DESCRIPTION

Figure 1:
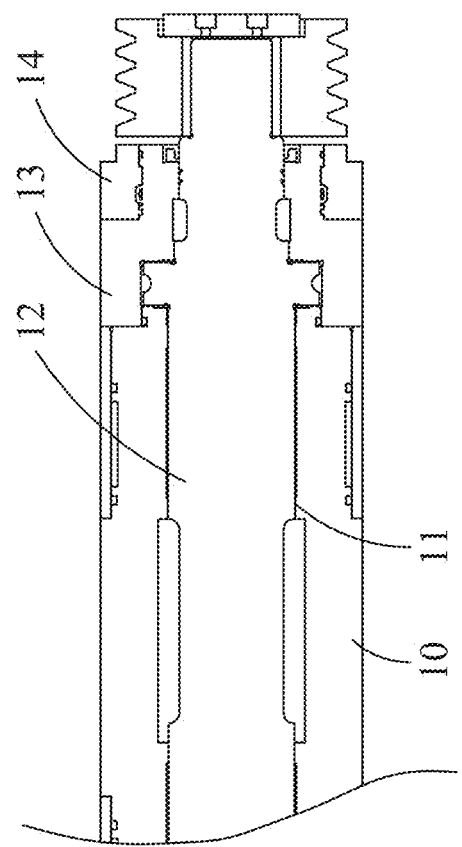
FIG. 1 is a sectional view of a hydrostatic-supporting bearing applicable to the spindle system for multi-task machines, the spindle module or a ball screw according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, a hydrostatic-supporting bearing applicable to the spindle system for multi-task machines, the spindle module or a ball screw according to the present disclosure is cross-sectional shown. A housing 10 provides thereinside an accommodation room 11 for receiving the spindle 12. The housing 10 is further sleeved at one end thereof by a shaft sleeve 13. The shaft sleeve 13 sleeving the spindle 11 is further sleeved at one end thereof by a top collar ring 14. With the housing 10, the spindle 12, the shaft sleeve 13 and the top collar ring 14, a basic structure for a hydrostatic spindle system or module is formed.

Figure 2:
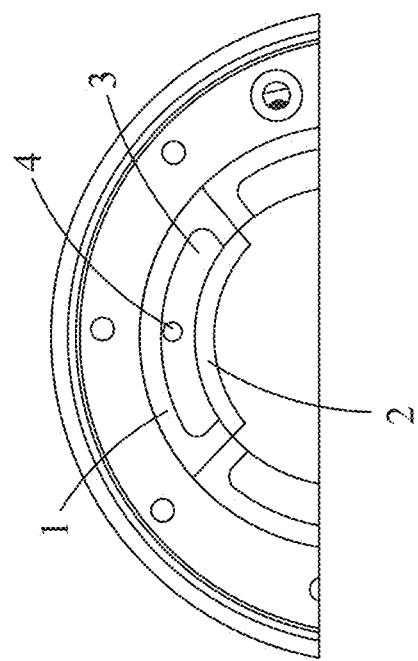
FIG. 2 is a schematic front view of the axial-directional oil chamber device according to the present disclosure.

Refer now to FIG. 1-1 and FIG. 2, which FIG. 1-1 is an enlarged view of the axial-directional oil chamber device of FIG. 1 and FIG. 2 is a schematic front view of the axial-directional oil chamber device according to the present disclosure. It is noted that the radial-directional oil seal edge 2 of the oil chamber is planar folded so as to help understanding the teaching of the present disclosure. As shown, the oil chamber 3 includes an axial-directional oil seal edge 1 and a radial-directional oil seal 2. The axial-directional oil seal edge 1 and the radial-directional oil seal edge 2 are extended to seal the hydrostatic oil chamber 3. Surrounding the spindle 12, an axial-directional spacing A and a radial-directional spacing A' are formed and there to generate required flow resistance to seal the oil chamber 3. Namely, a flow resistance R1 for the oil chamber 3 is formed between the axial-direction oil seal edge 1 and the axial-directional spacing A, while another flow resistance R2 for the oil chamber 3 is formed between the radial-direction oil seal edge 2 and the radial-directional spacing A'. The total flow resistance R for the oil chamber 3 is the sum of the R1 and R2. In particular, the flow resistance R1 would change as well while the axial-directional spacing A is varied. The lubricant oil is injected into the spindle 12 through an oil-injection orifice 4. By optimizing the flow resistance upon the spindle 12 of the oil chamber 3 through restriction control on the pressure source Ps and the orifice of the restrictor 15, the rigidity of the hydrostatic spindle can then be enhanced.

Figure 3:
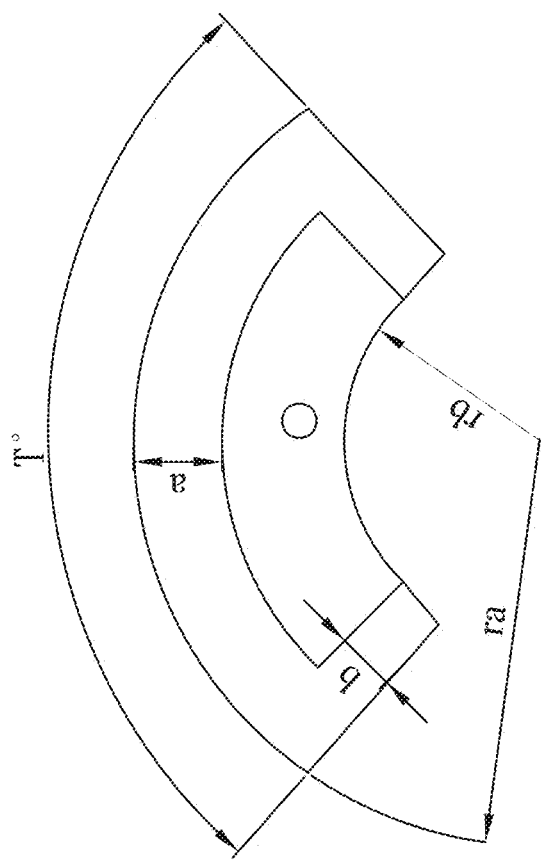
FIG. 3 shows schematically parameters for the hydrostatic chamber according to the present disclosure.
Figure 4:
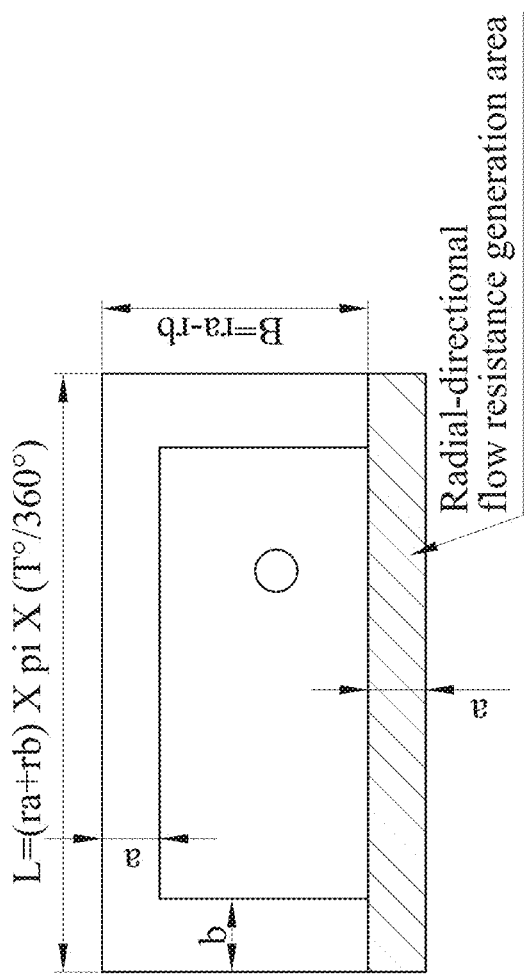
FIG. 4 is an alternative view of FIG. 3.
Figure 5:
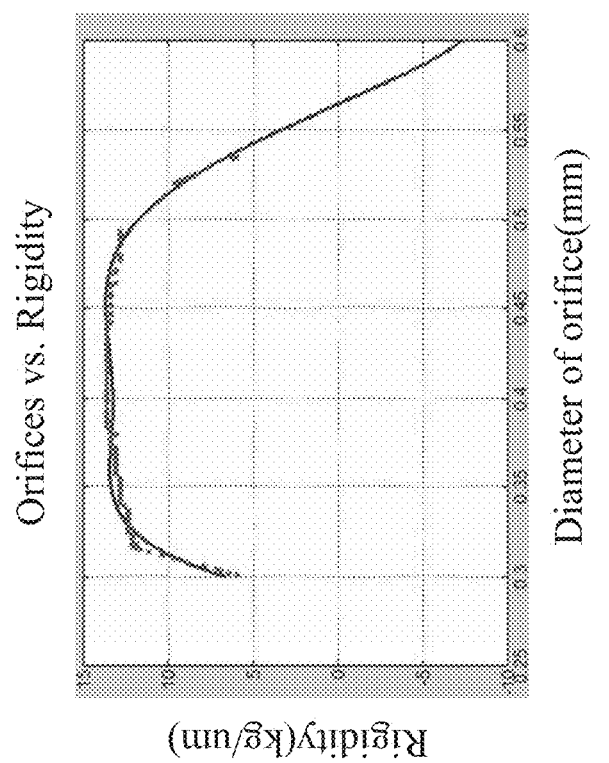
FIG. 5 is a plot showing relation of the rigidity and the diameter of the orifice according to the present disclosure.
Figure 6:
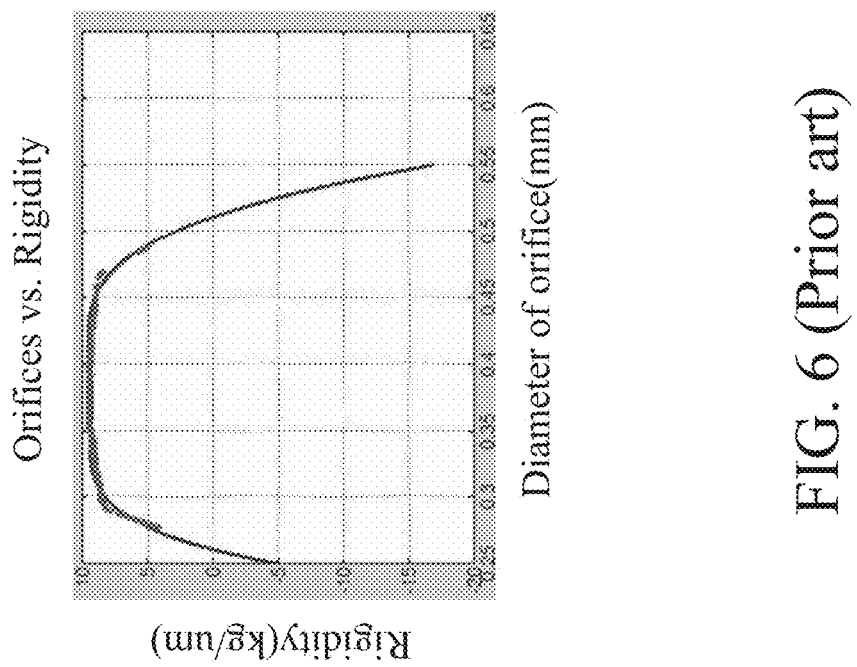
FIG. 6 is a plot showing relation of the rigidity and the diameter of the orifice for a conventional axial-directional hydrostatic oil chamber in the art.
Figures 1, 6:
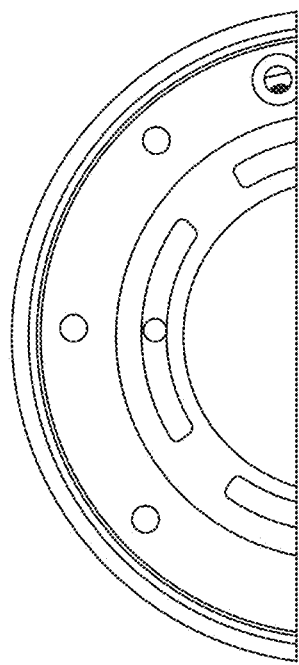
Figure 7:
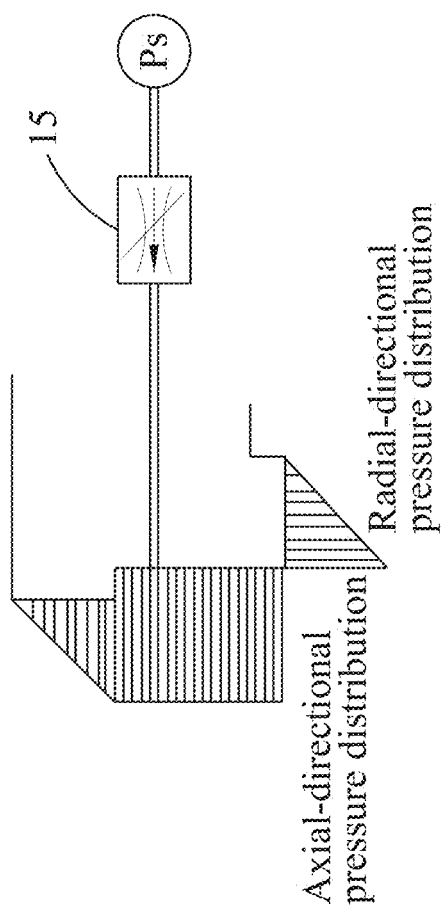
FIG. 7 shows schematically the pressure distribution of an oil chamber according to the present disclosure.
Figure 8:
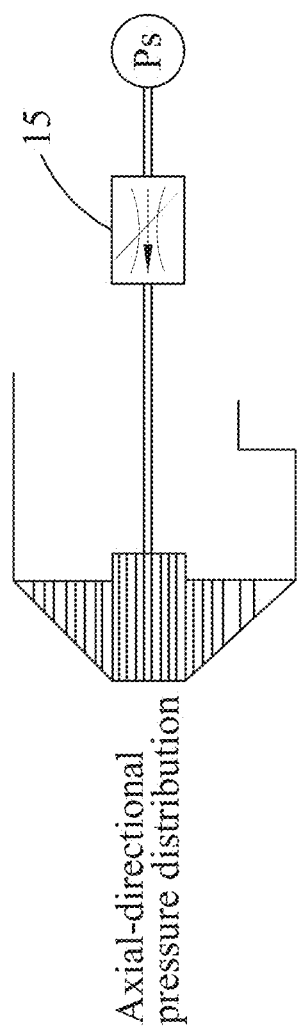
FIG. 8 shows schematically the pressure distribution for the hydrostatic oil chamber in the art.

Referring now to FIG. 3, parameters for the hydrostatic chamber according to the present disclosure are schematically shown. FIG. 4 is an alternative view of FIG. 3. The flow resistance R1 of the oil chamber is formed between the axial-directional oil seal edge 1 and the axial-directional spacing A, and is varied as the axial-directional spacing A changes. On the other hand, the flow resistance R2 of the oil chamber is formed between the radial-directional oil seal edge 2 and the radial-directional spacing A'. The total flow resistance R is computed by the equation of R=flow resistance R1+flow resistance R2. The optimal analysis is performed by having the restrictor 15 to restrict the flow through the orifice. Under the same design parameters and the same design specifications, the pressure distribution of the oil chamber of hydrostatic spindle according to the present is schematically shown in FIG. 7, and the corresponding plot for the relation of the rigidity and the diameter of the orifice is shown in FIG. 5. As illustrated, the optimal rigidity value in FIG. 5 is 13.6 kg/um. On the other hand, in the case that the conventional axial-directional hydrostatic oil chamber of hydrostatic spindle loaded by the axial-directional supporting bearing in the art, as shown in FIG. 6-1, is introduced to process the same optimal analysis by restricting the flow of the orifice, the corresponding pressure distribution for the hydrostatic oil chamber is shown in FIG. 8, and the related plot for the relation of the rigidity and the diameter of the orifice is shown in FIG. 6, in which the optimal rigidity value is only 9.46 kg/um. Apparently, the optimal value of the rigidity for the device taught by this disclosure is superior to that for the conventional design by 43%. The results in FIG. 5 and FIG. 6 are obtained by computations based on an algorithms disclosed in Hydrostatic Rotary Bearing with Angled Surface Self-Compensation, Precision Engineer Vol. 27, 2003. The characteristics for the computation include that the viscosity coefficient of the lubricant oil is 32, the pressure source has a pressure value of 40 bar, the outer diameter of the oil chamber is 85 mm, the inner diameter thereof is 60 mm, and the width thereof is 5 mm.

The parameter symbols for the hydrostatic oil chamber in this disclosure are listed as follows.

ra: outer diameter of the oil chamber
rb: inner diameter of the oil chamber
a: width of the island of the oil chamber
b: length of the island of the oil chamber
L: length of the oil chamber
B: width of the oil chamber
A: axial-directional spacing
A': radial-directional spacing
μ: viscosity coefficient
m: fluid density
Q: fluid flow
q: flow coefficient
d: diameter of the orifice
Ps: pressure of the pressure source
Pa: pressure of the oil chamber
A: working area of the oil chamber working area The algorithms for computing the rigidity for the optimal analysis in this disclosure are listed as follows.

The algorithms for computing the flow resistance R1 of the oil chamber:

$$R1 = 12 \times \mu \times a \times [L-b]/(A)^3 + 24 \times \mu \times b \times [B-a/2]/(A)^3 + 12 \times \mu \times a \times [L-b]/(A')^3$$

The algorithms for computing the flow resistance R2 of the orifice restrictor:

$$R2 = 8 \times m \times Q/(q^2 \times \pi^2 \times d^4)$$

The total flow resistance R is obtained by R=R1+R2, the total flow Q is obtained by Q=Ps/R, Pa=Q×R1, and $$\text{rigidity} = Pa(A - 0.001 \text{ mm}) \times (a) - Pa(A) \times (a).$$

In this disclosure, the rigidity implies the thrust difference for every 0.001 mm change of the oil membrane.

As disclosed above, the device of the axial-directional oil chamber of hydrostatic spindle according to this disclosure is to extend the axial-directional oil seal edge toward the radial-directional oil seal edge, such that a broader contact area can be obtained within the limited occupation space of oil chamber structure. Thereby, the working area of the hydrostatic bearing oil chamber can be enlarged, and the rigidity of the hydrostatic axial bearing can be increased as well. Further, by providing the teaching of this disclosure, the applicable field of the device of the axial-directional oil chamber of hydrostatic spindle can be upgraded to perform the multi-task machining from the mono-task machining.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A device of an axial-directional oil chamber of a hydrostatic spindle, applicable to an axial bearing oil chamber structure of a hydrostatic spindle module, comprising:
    an axial-directional oil seal edge of an oil chamber; and
    a radial-directional oil seal edge of the oil chamber;
        wherein the axial-directional oil seal edge and the radial-directional oil seal edge are extended to seal the oil chamber.
2. The device of the axial-directional oil chamber of hydrostatic spindle according to claim 1, further including a pressure source for increasing an axial-directional rigidity of the hydrostatic spindle module.

3. The device of the axial-directional oil chamber of hydrostatic spindle according to claim 2, further including a restrictor for increasing the axial-directional rigidity of the hydrostatic spindle module, the restrictor further having an orifice for flow restriction.

4. The device of the axial-directional oil chamber of hydrostatic spindle according to claim 3, further including an axial-directional spacing, a flow resistance being formed between the axial-directional spacing and the axial-directional oil seal edge of the oil chamber.

5. The device of the axial-directional oil chamber of hydrostatic spindle according to claim 3, further including a radial-directional spacing, a flow resistance being formed between the radial-directional spacing and the radial-directional oil seal edge of the oil chamber.

6. The device of the axial-directional oil chamber of hydrostatic spindle according to claim 3, further including an axial-directional spacing and a radial-directional spacing, a flow resistance being formed between the axial-directional spacing and the axial-directional oil seal edge, another flow resistance being formed between the radial-directional spacing and the radial-directional oil seal edge of the oil chamber.

7. The device of the axial-directional oil chamber of hydrostatic spindle according to claim 2, further including an axial-directional spacing, a flow resistance being formed between the axial-directional spacing and the axial-directional oil seal edge of the oil chamber.

8. The device of the axial-directional oil chamber of hydrostatic spindle according to claim 2, further including a radial-directional spacing, a flow resistance being formed between the radial-directional spacing and the radial-directional oil seal edge of the oil chamber.

9. The device of the axial-directional oil chamber of hydrostatic spindle according to claim 2, further including an axial-directional spacing and a radial-directional spacing, a flow resistance being formed between the axial-directional spacing and the axial-directional oil seal edge, another flow resistance being formed between the radial-directional spacing and the radial-directional oil seal edge of the oil chamber.

10. The device of the axial-directional oil chamber of hydrostatic spindle according to claim 1, further including an axial-directional spacing, a flow resistance being formed between the axial-directional spacing and the axial-directional oil seal edge of the oil chamber.

11. The device of the axial-directional oil chamber of hydrostatic spindle according to claim 1, further including a radial-directional spacing, a flow resistance being formed between the radial-directional spacing and the radial-directional oil seal edge of the oil chamber.

12. The device of the axial-directional oil chamber of hydrostatic spindle according to claim 1, further including an axial-directional spacing and a radial-directional spacing, a flow resistance being formed between the axial-directional spacing and the axial-directional oil seal edge, another flow resistance being formed between the radial-directional spacing and the radial-directional oil seal edge of the oil chamber.

\* \* \* \* \*